United States Patent [19]

King et al.

[11] Patent Number: 4,905,217
[45] Date of Patent: Feb. 27, 1990

[54] ENCLOSURE FOR OPTICAL DISK OR THE LIKE

[75] Inventors: Richard W. King, Bloomington, Ind.; Timothy P. Wilsey, Pittsfield, Mass.

[73] Assignee: Simplicity Products, Inc., Bloomington, Ind.

[21] Appl. No.: 272,939

[22] Filed: Nov. 18, 1988

[51] Int. Cl.⁴ .................... G11B 23/03; B65D 85/57
[52] U.S. Cl. .................................................. 369/291
[58] Field of Search .................. 369/291; 360/133; 206/306, 309, 311, 312, 444

[56] References Cited

U.S. PATENT DOCUMENTS

| | | | |
|---|---|---|---|
| 4,627,531 | 12/1986 | Clemens | 206/309 |
| 4,694,957 | 9/1987 | Ackeret | 206/309 |
| 4,707,821 | 11/1987 | Verhagen | 206/309 |
| 4,722,439 | 2/1988 | Grobecket | 206/309 |
| 4,760,502 | 7/1988 | Ackeret | 206/311 |

FOREIGN PATENT DOCUMENTS 214568 9/1987 Japan ................................ 206/309

Primary Examiner—Steven L. Stephan
Attorney, Agent, or Firm—Bernard, Rothwell & Brown

[57] ABSTRACT

An enclosure for an optical disk or the like in which the main element thereof is preferably formed of a one-piece structure and which is adapted to accept a cover element. The one-piece structure is formed of a pair of substantially flat wall elements which are spaced apart and enclosed at the lateral edges and preferably also at one end to form a flat, elongated cavity open at one end for storing and positioning the disk within the cavity. The disk is positioned within the cavity by internal positioning means which hold the disk by its edges in spaced apart relation to the walls of the cavity. A cover element closes the open end of the cavity and is used to assist manual insertion and removal of the disk.

1 Claim, 3 Drawing Sheets

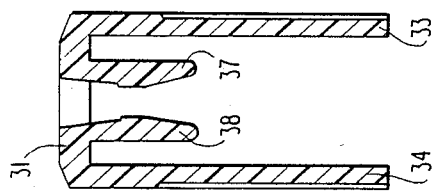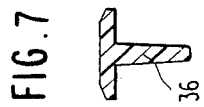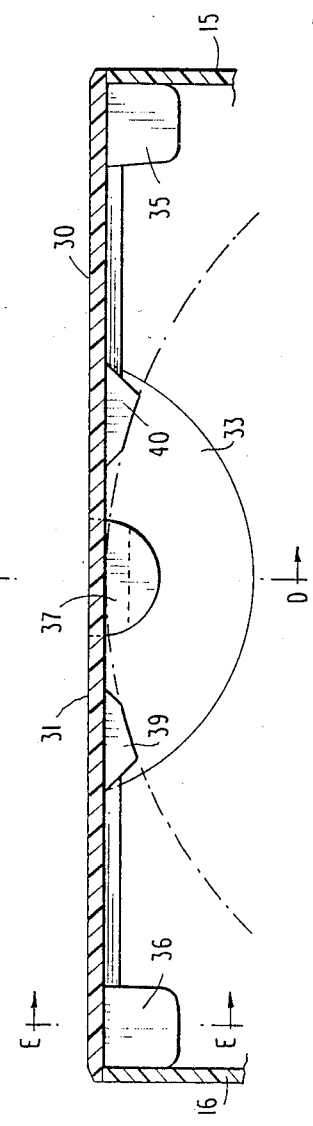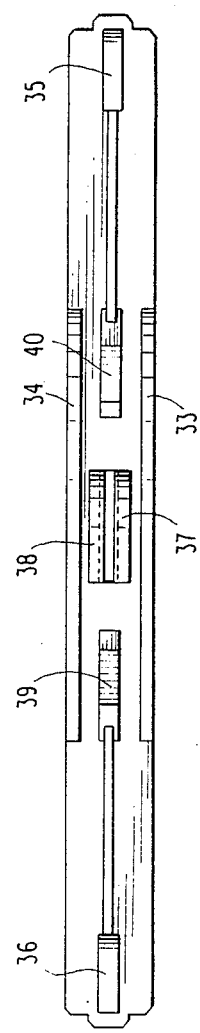

1

ENCLOSURE FOR OPTICAL DISK OR THE LIKE

FIELD OF THE INVENTION

This invention relates to portable enclosures or boxes for storing, moving and handling recorded or recordable disks such as compact disks containing recorded audio and/or video information or digitally encoded information.

BRIEF DESCRIPTION OF PRIOR ART

Various types of planar disks are in use at the present time to record and store information which is to be retried by various means such as by optical or magnetic means. Typical of such disks are compact disks in which information is digitally recorded by use of a laser beam and then read optically by a laser beam. Information may be recorded, for example, using an ablative process in which pits are formed in a film on the disk to represent digital "ones" are "zeroes" which are read optically and transformed into sound or other information as recorded. Other types of recording such as phase change or magneto-optic techniques are also used. Such disks are used to record audio information such as musical renditions, video information such as visual images and digital information for use as read only and other memories for use in various applications such as computer applications. In most instances at the present time such disks are sold with information already recorded thereon. In other applications, such disks are sold in blank form and are used by the customer to record information thereon. In the latter case, for example, optical disks are sold for use as computer storage media and are used in hard disk storage systems.

In either case, optical imperfections in or on the surfaces of such disks interfere with both the recording and retrieval of information stored in the disks. Care must therefore be taken in the storage, moving and handling of such disks to avoid causing any such imperfections.

Compact disks containing laser recorded information are typically packaged in enclosures which protect the disks during storage and shipment. Enclosures commonly used at the present time comprise a three piece assembly consisting of a base or bottom element, an insert or tray in the base/bottom element for positioning and supporting the disk in the base element and a lid or cover which is hinged to the base/bottom element and is closed thereon after the disk is mounted therein on the tray. The enclosure is typically transparent and graphics relating to the disk and containing trademark and sales promotional information are usually inserted in the lid.

The tray usually contains a cavity having a circular shape to receive the disk and a center projection which enters and engages the aperture in the center of the disk when the disk is placed in the cavity. The surface of the cavity contacts the surface of one face of the disk, usually the playing surface, and the inner surface of the cover is positioned closely adjacent the opposite face surface of the disk when the cover is closed on the base/bottom element. The depth of the cavity is such that, when the cover is closed there is insufficient clearance between the face of the disk and the adjacent surface of the closed cover to permit the disk to escape from the cavity. However, the surface of the disk can contact the inner surface of the lid or graphics upon outward movement of the disk which can be caused by typical handling or by sudden movements, shocks or vibration or if the disk is slightly misaligned or loosely mounted when placed in the cavity. The other surface of the disk remains in contact with the surface of the insert and is restrained only by the edges of the cavity and/or two small holding tabs and the resilient engagement of the center projection with the center aperture of the disk.

With the prior art enclosure mechanisms of the type just described, even limited movements of the disk within the enclosure, which can occur in transportation and handling, can cause abrasive surface contacts between the surfaces of the disk and the inner surfaces of the enclosure. These abrasive surface contacts can result in the creation of imperfections and defects in or on the disk surface which interfere with recording and reading of information on the disk. Such defects are particularly troublesome in the case of compact disks which are read optically. Even though prone to problems of the type described, such prior art disk enclosures are expensive to manufacture and are relatively complex to handle even in normal use. They consist of three separate parts which must be assembled together in a format requiring relative precision in the interfacing of the components. They are also poorly adapted for ease of use in that the required handling for insertion and removal of the disks from the enclosures can result in surface scratches and other defects being inadvertently caused by the user in the process of handling. Further, such enclosures are awkward and clumsy to use.

SUMMARY OF THE INVENTION

The present invention provides an improved enclosure for optical disks and the like, such as compact disks, in which the aforementioned disadvantages of the prior art devices are overcome. The enclosure of the present invention provides effective storage and ease of use of optical disks, such as compact disks, in a manner to protect the surfaces of the disk enclosed therein and is simple and inexpensive to manufacture. It is also less bulky and weighs less than typical prior art enclosures. It is therefore less expensive to ship in volume quantities and takes up less room in storage at the point of use as well. It is comprised, in a preferred embodiment thereof, primarily of a single, one-piece main functional element and utilizes a supplemental element or cover which is removable from the one-piece main element and is interchangeable between all such main elements. The supplemental element or cover is also adapted, in one embodiment thereof, to contain graphic material identifying the disk and including descriptive and sales promotional material as well.

The main element of the enclosure of the present invention, in one embodiment thereof, is formed of a single, one-piece part which has a cavity therein formed by spaced apart, substantially flat walls having inner, planar facing surfaces. The cavity is in the form of a substantially flat, elongated space open at least at one end thereof for receiving the disk. The planar facing surfaces of the cavity are spaced apart a distance somewhat greater than the thickness of the disk so that when the disk is mounted in the cavity, there is a clearance between the surfaces of the disk and the inner planar surfaces of the cavity.

The lateral edges of the cavity include means for engaging the edges of the disk and positioning the disk within the cavity with the face surfaces of the disk spaced apart from the inner planar surfaces of the cavity. Such positioning means include in one embodiment rails or slots along opposite lateral edges of the cavity for engaging and restraining opposite outer edges of the disk which are outside of the active recorded or recording zone of the disk. In such embodiment, the third inner edge of the cavity contains resilient holding or gripping means which may be in the form of a slot or tab element which resiliently engages a third portion of the outer edge of the disk, again outside the active recorded or recording region. When the disk is engaged by the resilient holding means, the disk is resiliently held against withdrawal from the cavity and is positioned and held within the cavity with the face surfaces thereof in spaced apart relationship with respect to the planar inner surfaces of the cavity.

The oppositely positioned rails or slots also provide guidance for inserting the disk into the cavity. The disk is guided into the cavity by the rails or slots without the active face surfaces of the disk touching the planar inner surfaces of the cavity and is also guided into resilient restraining contact with the resilient slot or tab elements on the third inner edge of the cavity. The same guidance is provided during withdrawal of the disk from the cavity of the enclosure, so that the active face surfaces of the disk are spaced from contact with the inner planar surfaces of the cavity during both insertion and removal of the disk.

A cover member is placed over the single open end of the cavity to complete closure of the disk within the cavity. The cover member includes, in one embodiment of the invention, tapered tabs which are wedged into the open end of the cavity to secure the cover in place. The cover member also includes finger grip portions extending over cut out portions of the enclosure at the open end of the cavity, and having inner portions thereof which engage the outer edge of the disk to permit grasping thereof and removal of the disk from the cavity without the need for touching the active face surfaces thereof. Such inner portions also engage the edge of the disk when the cover member is in its normal secured position and therefore serve as further means for securing the edge of the disk when it is stored in the enclosure.

The invention and the preferred embodiments thereof will be hereinafter more fully described with reference to the accompanying drawings.

BRIEF DESCRIPTION OF THE DRAWINGS

FIG. 5 is a cross sectional view of the upper portion of the embodiment of FIG. 1 with a cover element of the invention in place;

FIG. 6 is a cross sectional view of the cover element of FIG. 5 taken along the line D—D of FIG. 5;

FIG. 7 is a cross sectional view of one of the tabs of the cover element of the embodiment of FIG. 5 taken along the line E—E of FIG. 5;

FIG. 8 is a bottom view of the cover element of the embodiment of FIG. 5;

DETAILED DESCRIPTION

Figure 1:
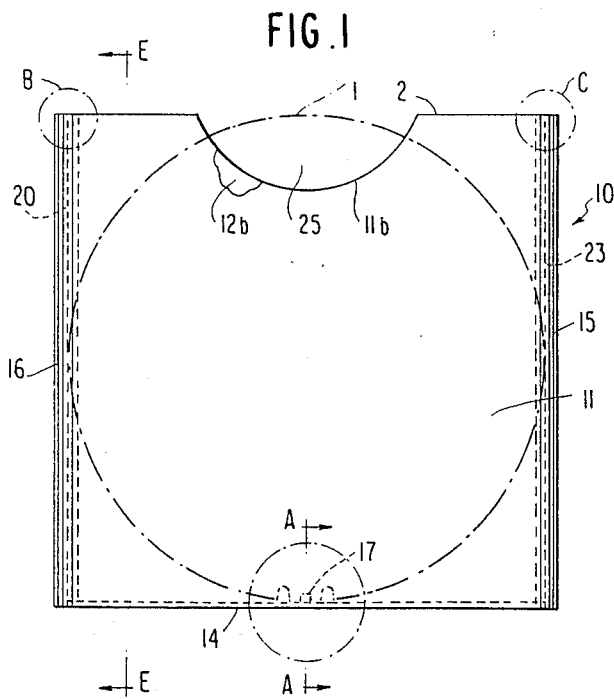
FIG. 1 is a front face view of a disk enclosure embodying the present invention.

Referring now to the drawings, FIG. 1 is a front face view of a one-piece disk enclosure 10 embodying the present invention. The enclosure 10 is adapted to receive and store a disk such as a compact disk 1 shown in broken lines in FIG. 1. The enclosure 10 is provided with an opening 2 in one end thereof through which the disk is inserted and removed.

Figure 1A:
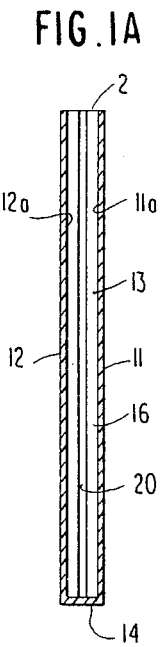
FIG. 1A a cross sectional view of the embodiment of FIG. 1 taken along line E—E.

Enclosure 10 is preferably a one-piece, unitary molded part formed of plastic or a similar material and is formed of substantially planar parallel side walls 11 and 12 spaced apart as shown in FIG. 1A to form a cavity 13 therebetween together with end wall 14 and edge walls 15 and 16. The side walls 11 and 12 have substantially parallel, spaced apart inner, substantially planar surfaces 11a and 12a which form the elongated, substantially flat shape of the cavity 13. The distance between the inner facing surfaces 11a and 12a is selected to be somewhat greater than the thickness of the disk to be stored so that when the disk is stored within the cavity 13, the active surfaces of the disk are spaced apart from the inner facing surfaces 11a and 12a.

Figure 2:
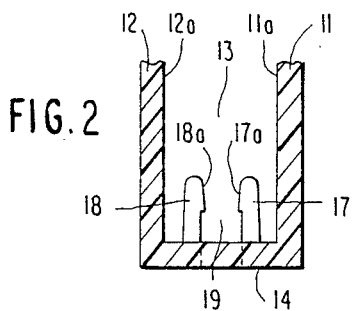
FIG. 2 is a cross sectional view of the lower portion of the embodiment of FIG. 1 taken along the line A—A of FIG. 1.

As shown in FIGS. 1 and 2, a pair of opposing tab or grip elements 17 and 18 are mounted on the end wall 14 to form resilient means with a space 19 therebetween to receive an edge of the disk when it is fully inserted into the cavity 13. The grip elements 17 and 18 are preferably integral with and of the same material as the side and end walls, preferably plastic or a similar material, and extend in cantilever fashion from the end wall 14 to provide a resilient resistance when spread apart to receive the outer edge of the disk. The distance between the grip elements 17 and 18 forming the space 19 is selected such that a snug fit is made to grip the outer edge of the disk against the resilience of the cantilever mounting of the elements. Entrance of the disk into the space 19 is facilitated by sloping portions 17a and 18a on grip elements 17 and 18 respectively along the entrance path of the disk to the space 19 as shown in FIG. 2. When the disk is mounted in the cavity 13, the resilient force exerted on the outer edge thereof by the resilient engagement of cantilever mounted grip elements 17 and 18 resists movement of the disk in a planar direction out of the cavity while at the same time positioning the disk with the active face surfaces thereof in spaced apart relation with respect to the inner surfaces 11a and 12a of the side walls 11 and 12.

Figure 2A:
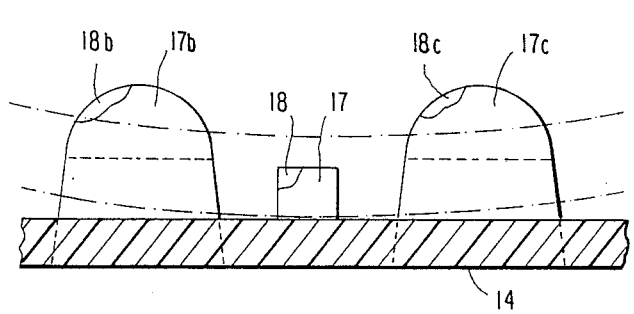
FIG. 2A is an enlarged view of the lower encircled portion of FIG. 1.

As shown in FIG. 2A, additional pairs of grip elements 17b, 18b and 17c, 18c are preferrably positioned on either side of the grip elements 17 and 18 to grip the outer edge of the disk and secure it against movement in the planar direction. These grip element pairs 17b, 18b and 17c, 18c are of the same general cross sectional shape and operate in the same manner as grip elements 17 and 18 illustrated in FIG. 2.

The inner surfaces 17a and 18a of the grip elements 17 and 18 are preferably smooth and non-abrasive so as not to damage the edge of the disk and may be polished in any suitable manner to enhance such desired properties. The same applies to the inner surfaces of the additional pairs of grip elements 17b, 18b and 17c, 18c.

Figure 3:
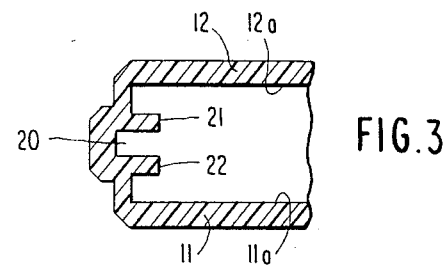
FIG. 3 is a top view of the edge region B of the embodiment of FIG. 1.

The edge walls 15 and 16 include elongated rails or slots 20 and 23 for engaging the outer edges of the disk when it is positioned in the cavity 13. One embodiment of this structure is shown in the partial view of FIG. 3 wherein slot 20 is formed in edge wall 16. The slot 20 may be formed by a pair of extending rails 21 and 22 or by a slot extending into the edge wall 16 or by a combination of both as shown in FIG. 3. Slot 23 of the same structure as slot 20 extends along the inner surface of the opposite edge wall 15. Preferably the slots 20 and 23 extend from the entrance opening 2 to at least the midway point between the entrance opening 2 and the end wall 14 so that the outer edges of the disk are engaged from the point of entry of the edges to the enclosure to the point of engagement with the grip elements 17 and 18 on the end wall 14. Similarly, upon removal of the disk from the enclosure, the edges of the disk are engaged to the point of removal of the edges of the disk from the enclosure. In the embodiment shown, the slots 20 and 23 also extend to the entrance region 2 in order to provide a securing engagement for the cover for the enclosure 10 as will later be explained. The entrance regions of the slots 20 and 23 may be tapered in the vicinity of the opening 2 to facilitate entrance of the disk into the slots.

Figure 4:
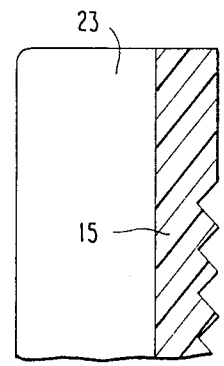
FIG. 4 is an enlarged side view of the edge region C of the embodiment of FIG. 1.

The outer edges of the edge walls 15 and 16 are preferably serrated as shown in FIG. 1 and in the enlarged view of FIG. 4 to facilitate gripping the enclosure 10 for insertion and removal of the disk. Side walls 11 and 12 are provided with aligned cut out portions 11b and 12b which form an access opening 25 for gripping the disk for removal from the enclosure and for faciliting the full insertion thereof into the enclosure.

The cavity 13 is basically formed by the planar side walls 11 and 12 held in spaced apart relationship by the edge walls 15 and 16. The enclosure of the invention may be formed in this manner without the end wall 14 so that, in such embodiment, the cavity 13 is open at both ends. In such embodiment, the grip elements 17 and 18 would be positioned in one or both of the edge walls 15 and 16 to grip the edges of the disk against planar movement from the enclosure. It is preferred, however, that the end wall 14 be included for additional structural rigidity and to maintain the desired spacing and orientation of the structure and the disk stored therein.

Referring now to FIG. 5, there is shown a cross sectional view of the upper portion of the enclosure 10 with a cover element 30 in place and covering the opening 2. The cover element 30 is preferably made of a single piece, preferably a molded plastic or similar material, and comprises a cover portion 31 having dimensions for closing the opening 2, and opposing finger grip portions 33 and 34. The cover element 30 also includes tabs 35 and 36 for securing the cover element in place on the enclosure 10.

The finger grip portion of the cover 30 is shown in cross section in FIG. 6. Located within the finger grip portions 33 and 34 are cantilevered elements 37 and 38 which are spaced apart to engage and grip the outer edge of the disk when the disk is inserted in the enclosure 10. Both the finger grip portions 33 and 34 and the elements 37 and 38 are cantilevered from the cover portion 31 and thus a finger pressure in a direction to squeeze together the grip portions 33 and 34 also causes deflection of the elements 37 and 38 to increase gripping force on a disk when the edge thereof is located between elements 37 and 38. The cover element 30 also contains stop members 39 and 40 to engage the outer surface of the edge of the disk to limit the engagement of the cover element with the edge of the disk.

The cover element is held in place over the opening 2 by means of engagement of the tabs 35 and 36 with the opening of the enclosure 10. In the embodiment shown, the tabs 35 and 36 are tapered as shown in FIG. 7 and thus make a wedging engagement with slots 20 and 23 in the edge walls 15 and 16 as the cover element 30 is pushed into place while, at the same time, engagement means formed by the cantilevered elements 37 and 38 resiliently engage the outer edge of the stored disk. A bottom plan view of the cover element 30 is shown in FIG. 8 illustrating the placement of the finger grips 33 and 34, tabs 35 and 36, cantilevered elements 37 and 38 and stops 39 and 40.

Insertion and removal of the disk using the cover element 30 will now be described. Assume that a disk 1 is stored in the enclosure 10 with cover element 30 secured in place. The edges of the disk engage the slots 20 and 23 in the side walls and the elements 17 and 18 in the end wall 14. The disk is held in place in the enclosure 10 by the resilient engagement of the elements 17 and 18 as described above and is further secured by the cover element 30 by engagement of the cantilevered elements 37 and 38 and the stops 39 and 40 with the upper edge of the disk, with the cover element being secured in place by engagement of the tabs 35 and 36 with the slots 20 and 23.

The disk is removed by grasping the finger grip portions 33 and 34 on the outer surfaces thereof and exerting a slight squeezing pressure thereon while pulling the disk out of the enclosure 10 while holding the enclosure on the serrated edges. The disk is thus removed without the need for contacting any portion of the active surface thereof and while the disk is held and guided in spaced apart relation to the inner surfaces of the cavity 13 by the slots 20 and 23. The disk may be inserted by grasping the finger grip portions of the cover elenent and engaging the edge portion of the disk with the cantilevered elements 37 and 38 and, with the disk so held, inserting the disk into the enclosure 10 by guiding the edges of the disk into engagement with the slots 20 and 23 and then moving the disk in such guided engagement into the enclosure until the disk is firmly engaged with the elements 17 and 18 at the bottom of the cavity 13. The cover is then pushed firmly into place to secure the enclosure.

It will be observed that the essential functions of mounting the disk are performed in the preferred embodiment of FIG. 1 in the single, one-piece, unitary enclosure 10 acting as a main functional element. In this embodiment, the disk is positioned and held within the planar space of the cavity 13 with the active surfaces held in spaced apart relation to the inner surfaces of the cavity and with at least one edge gripped to prevent the disk from sliding out of the enclosure. While the cover arrangement to be shown and described represents a preferred embodiment, the cover can take various forms as long as it performs the basic function of closing the opening 2 in the enclosure 10. It should therefore be understood that various cover elements may be used and also that, for example, various other techniques may be employed for securing the cover element in place.

Figure 9:
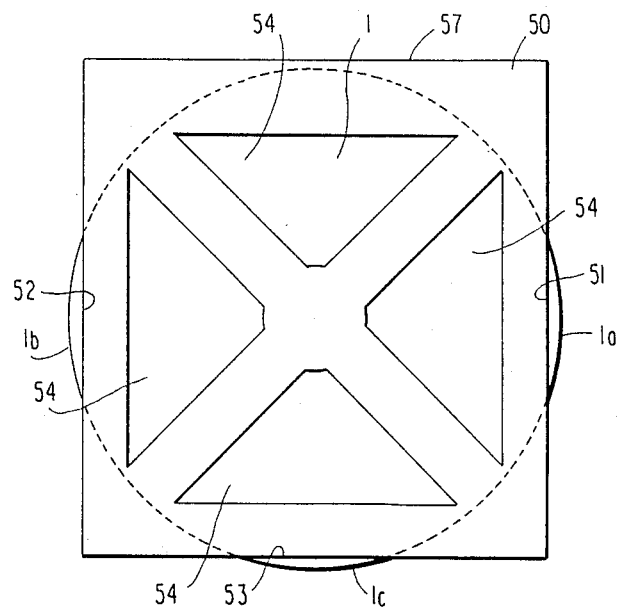
FIG. 9 is a front face view of the enclosure of FIG. 1 with another embodiment of a cover element of the invention in place.
Figure 10:
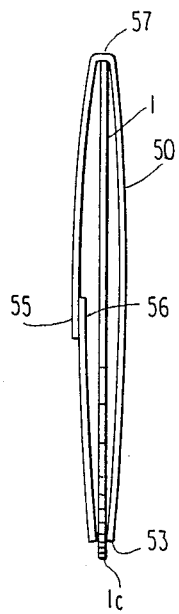
FIG. 10 is a side cross sectional view of the embodiment of FIG. 9.

Another embodiment of the enclosure of FIG. 1 and a cover element is shown in FIGS. 9 and 10. In this embodiment, a cover element 50 formed of a flexible, foldable material is wrapped around a disk 1. The cover element 50 has slots 51 and 52 formed in the opposite edges thereof and an additional slot 53 formed in one end thereof. The slots 51, 52 and 53 are positioned such that edge portions 1a, 1b and 1c of the disk 1 extend from the cover element 50. These extending edge portions 1a, 1b and 1c are thus free to engage the positioning and grip elements on the inner edges and end of the enclosure 10 as described in connection with the embodiment of FIG. 1. The cover element 50 is thus folded around the disk 1 and inserted into the enclosure 10 with the disk edge portions 1a, 1b and 1c engaging the positioning and gripping means within the cavity 13 in the enclosure 10. The disk may then be removed from the enclosure by grasping the finger portions of the cover 50 and, with the cover 50 engaged with the disk 1, pulling the disk out of the enclosure with the cover remaining engaged with and protecting the disk during the process. The cover can be allowed to remain wrapped around the disk to facilitate handling befor being removed for playing of the disk. The front portion of the cover 50 may include openings 54 which expose portions of the stored disk 1 and which allow printed material and graphics on the disk 1 to be viewed from the exterior of the cover 50 without opening the cover.

In the embodiment shown in FIGS. 9 and 10, the cover 50 is made of a single piece which is wrapped around the disk 1 as best illustrated in FIG. 10 and includes overlapping flap portions 55 and 56 for completing the extension of the cover around the disk. The flap portions 55 and 56 may include interlocking inserts portions or tabs for securing the cover 50 in place on the disk 1. The cover 50 is provided with one edge 57 which is available for printed matter such as the title of the disk which can be viewed from that edge when the disk is stored on edge or stacked with other disks.

The cover 50 also provides a means for gripping the disk with the fingers to insert and remove the disk and to handle it without the need for touching the surfaces of the disk. It also provides surface space for custom graphics.

The one-piece enclosure of the present invention is inexpensive to manufacture and is rugged and easy to use. It can be manufactured as a single element, for example in essentially one step in the form of a single, one-piece unitary plastic molding, and is readily adaptable to attractive packaging appearance design. The enclosure of the present invention is lighter in weight and smaller in volume than conventional packages now typically used. It is superior in performance to devices available in the prior art in protecting the surfaces of disks both in storage and in use and, in combination with the cover element of the present invention, permits the handling of such disks with a minimum of exposure to possible scratching and occurrence of other surface and optical defects.

The enclosure of the present invention is particularly useful as a package for enclosing optical disks on which information has been recorded optically such as by means of a laser beam or which are adapted for having information optically recorded thereon. Such disks in one form thereof are commonly referred to as "compact disks". The term "optical disks" is intended to include all such types of disks. The enclosure of the present invention may also be used as a package for other types of disks of similar structure such as hard disks for recording information magnetically and the phrase "optical disk or the like" refers to all such disks whether optical recording and retrieving means are used or other methods of recording and retrieving are employed. It should be understood that the detailed aspects of the embodiments presented herein are set forth for purposes of full disclosure and are not intended as limiting in any way. Various changes, modifications and substitutions will thus occur to those skilled in the art and will fall within the true scope and spirit of this invention as set forth in the appended claims.

What is claimed is:

1. An enclosure for an optical disk or the like, comprising:

a pair of elongated, spaced apart substantially parallel side walls having substantially planar, spaced apart inner surfaces facing each other and forming an elongated, substantially flat space therebetween;

edge walls extending between opposed lateral edges of said side walls to enclose the lateral edges of said elongated space;

an end wall extending between said side walls at one end thereof to enclose said one end of said elongated space and to form with said side walls and said edge walls a partially enclosed elongated and substantially flat cavity between said spaced apart, inner facing surfaces of said side walls with the other end of said cavity remaining open to form means for inserting and removing a disk into and from said cavity;

positioning means within said cavity for positioning the disk within said cavity including means for engaging the outer edges of the disk at a plurality of spaced apart locations around the perimeter thereof to position the disk with the active face surfaces thereof positioned and held in spaced apart relation to said inner facing surfaces of said side walls; and a cover element for insertion into the open end of said cavity, including engagement means for engaging the disk and finger grip portions interacting with said engagement means to increase the engaging force on the disk when said finger grip portions are grasped and squeezed to remove the disk from said cavity.

* * * * *